(12) United States Patent  
Stockton et al.

(10) Patent No.: US 10,288,822 B2  
(45) Date of Patent: May 14, 2019

(54) INSTALLATION OF OPTICAL FIBER CABLES IN DUCTS

(71) Applicant: PPC BROADBAND FIBER LTD., Woodbridge (GB)

(72) Inventors: David Stockton, Woodbridge (GB); Kim Samuel Howard Leeson, Ipswich (GB)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/696,108

(22) Filed: Sep. 5, 2017

(65) Prior Publication Data

US 2017/0363819 A1    Dec. 21, 2017

Related U.S. Application Data

(63) Continuation of application No. 15/047,133, filed on Feb. 18, 2016, now Pat. No. 9,753,234, which is a continuation of application No. 14/536,013, filed on Nov. 7, 2014, now Pat. No. 9,285,559.

(51) Int. Cl.  
    *G02B 6/38*         (2006.01)  
    *G02B 6/44*         (2006.01)

(52) U.S. Cl.  
    CPC ......... *G02B 6/3898* (2013.01); *G02B 6/3821* (2013.01); *G02B 6/3849* (2013.01); *G02B 6/4465* (2013.01); *G02B 6/3879* (2013.01)

(58) Field of Classification Search  
None  
See application file for complete search history.

(56) References Cited

U.S. PATENT DOCUMENTS

| | | | |
|---|---|---|---|
| 4,684,161 A | 8/1987 | Egner et al. |
| 4,684,211 A | 8/1987 | Weber et al. |
| 5,863,083 A | 1/1999 | Giebel et al. |
| 5,923,804 A | 7/1999 | Rosson |
| 6,104,855 A | 8/2000 | Jeon |
| 6,234,683 B1 | 5/2001 | Waldron et al. |
| 6,389,214 B1 | 5/2002 | Smith et al. |
| 8,285,096 B2 | 10/2012 | Coleman et al. |

(Continued)

FOREIGN PATENT DOCUMENTS

| | | |
|---|---|---|
| EP | 2431776 A1 | 3/2012 |
| GB | 2485070 A | 5/2012 |

*Primary Examiner* — Sung H Pak  
(74) *Attorney, Agent, or Firm* — Oliff PLC

(57) ABSTRACT

A protective caddy for the installation of an optical fiber cable in optical fiber ducting which temporarily protects a duplex optical fiber cable assembly for an optical fiber duplex connector during insertion of the assembly into a length of ducting. The duplex optical fiber cable assembly comprises a duplex optical fiber cable and a pair of optical fiber connector sub-assemblies. The protective caddy comprises a pair of receptacles, each for receiving one of the optical fiber connector sub-assemblies. Each receptacle has a recess for protectively receiving the termination end of one of the optical fiber ferrules. In use, both the duplex optical fiber cable and the pair of optical fiber connector sub-assemblies are held to the elongate body so that the termination ends are protected by the recesses during insertion of the protective caddy and duplex optical fiber cable assembly into the length of ducting.

28 Claims, 5 Drawing Sheets

(56) References Cited

U.S. PATENT DOCUMENTS

| | | | |
|---|---|---|---|
| 8,412,017 B2 | 4/2013 | Kowalczyk et al. | |
| 8,620,129 B2 | 12/2013 | Rudenick et al. | |
| 9,057,862 B2 | 6/2015 | Strasser et al. | |
| 9,164,233 B2 | 10/2015 | Wouters | |
| 9,297,976 B2 * | 3/2016 | Hill | G02B 6/3826 |
| 9,753,234 B2 * | 9/2017 | Stockton | G02B 6/3821 |
| 2008/0226234 A1 | 9/2008 | Droege | |
| 2009/0238523 A1 | 9/2009 | Honma et al. | |
| 2009/0238534 A1 | 9/2009 | Ahmed | |
| 2010/0202748 A1 * | 8/2010 | Pierce | G02B 6/54 385/136 |

* cited by examiner

INSTALLATION OF OPTICAL FIBER CABLES IN DUCTS

CROSS REFERENCE TO RELATED APPLICATIONS

This application is a continuation of U.S. patent application Ser. No. 15/047,133, filed Feb. 18, 2016, pending, which is a continuation of U.S. patent application Ser. No. 14/536,013, filed Nov. 7, 2014, now U.S. Pat. No. 9,285,559, both of which are incorporated fully herein by reference.

BACKGROUND a. Field of the Invention

The present invention relates to the installation of an optical fiber cable in optical fiber ducting, which may be an optical fiber microduct, and in particular to the installation in ducting of optical fiber cabling carrying optical fibers terminated at one or more multiple optical fiber connectors.

b. Related Art

Optical fiber connectors are used to join optical fibers where a connect/disconnect capability is required. The basic connector unit is a connector assembly at the end of a length of optical fiber cable, which will include a protective outer sheath around a coated optical fiber. The optical fiber will have an optical fiber core, and will often have a primary coating applied to the fiber during manufacture and a surrounding secondary polymer coating. Such a coated optical fiber is referred to as a buffered optical fiber. The buffering provides such functions as mechanical isolation, protection from physical damage and fiber identification for use during installation, but the buffered optical fiber is itself quite delicate where this is exposed for termination in a connector at the end of the protective outer sheath of the cable.

A dual connector assembly consists of two connector plugs. Due to the polishing and tuning procedures that may be incorporated into optical connector manufacturing, connectors are generally assembled onto optical fiber in a supplier's manufacturing facility. However, the assembly and polishing operations involved can be performed in the field.

SC optical fiber connectors and LC optical fiber connectors are the most common types of connectors on the market. In many data centre applications, small connectors (e.g., LC) and multi-fiber connectors (e.g., MTP) are replacing larger, older styles of connector (e.g., SC), allowing more fiber ports per unit of rack space.

Modern connectors typically use a "physical contact" polish on the fiber and ferrule end, which usually has a slightly curved, convex surface, so that when fibers are mated only the fiber cores touch, not the surrounding ferrules. Some manufacturers have several grades of polish quality, for example a regular FC connector may be designated "FC/PC" (for physical contact), while "FC/SPC" and "FC/UPC" may denote "super" and "ultra" polish qualities, respectively. Higher grades of polish give less insertion loss and lower back reflection. When a connector is terminated or assembled in the field, any damage to the polished ferrule and fiber of the connector can cause very high insertion loss.

Optical fiber cables are frequently routed in ducts. The ducts in which optical fiber cables are installed are usually made of cylindrical polyethylene tubing with a diameter ranging from typically 25 mm to 100 mm. Sometimes optical fiber cables are installed inside sub-ducts which are routed inside larger ducts, such as this type of polythene tubing or ducts formed in other materials, such as like concrete. Small sub-ducts are usually referred to as microducts and are often used to install small microduct fiber optic cables. Microducts have a size ranging from typically 3 mm to 16 mm and are may be installed as bundles inside larger ducts.

The invention described below is particularly applicable to the installation of multiple optical fiber cabling inside microducts inside microducts, for example duplex optical fiber cabling, where the internal diameter of the microduct may be less than the maximum width of the multiple optical fiber connector to be fitted at the terminated end of the cabling. In the context of the present invention, the term "duplex" is used to mean "dual", "two" or "twin" fibers or assemblies, rather than a single fiber used for bi-directional transmission. Similarly, the term "multiple" is used to mean "two or more".

As will become apparent, the invention may, however, also be useful when installing duplex or multiple optical fiber cabling inside larger ducts, and therefore the terms "duct" and "ducting" as used in relation to the invention apply both to microducts and to larger ducts for routing optical fiber cables without microducting.

One common form of optical fiber cable is the duplex optical fiber cable, with one fiber being used for transmitting (Tx) and the other fiber being used for receiving (Rx). For convenience, the duplex optical fibers are terminated within a duplex optical fiber connector unit having a joined pair of side-by-side connectors, each with a termination ferrule for terminating one of the optical fiber cores. The duplex optical fibers may be held within a cable having a single outer sheath or in a cable having a pair of joined outer sheaths. Multiple duplex pairs may also be provided within one cable, each duplex pair being for termination in one duplex connector. The invention is applicable to any such cable having at least one pair of optical fibers for termination in a duplex optical fiber connector, where the optical fiber cable is to be installed inside an optical fiber duct.

The installation of fiber optic cables in ducts can be done by pulling, in which a pre-installed thread or wire inside the duct is used to pull the connector end of an optical fiber cable down a length of the ducting. Usually, the cable being inserted into the near end of the duct is mechanically pushed at the same time. Alternatively, a technique called cable jetting (also called cable blowing), can be used, together with cable pushing. In cable jetting, high pressure air is blown down the duct and the flow of air pulls along the inserted cable until the cable exits the far end of the duct.

It is not common to install a terminated fiber cable into already occupied duct because of the danger of entanglement and damage. The space inside the duct is normally limited by the customer's desire to use the smallest possible duct. Installing a duplex connector in a duct would be more difficult than installing a simplex connector owing to the larger dimensions of the duplex connector at the end of the cable. Even in the case of the smaller LC optical fiber duplex connector, there may be inadequate clearance inside the duct for the duplex connector when pulling or jetting the cable down the length of ducting. There is also the problem that the duplex connector, or the terminated optical fiber ferrules within the connector, may have to be protected from damage or contamination during installation within the ducting, which may require additional protection to be fitted to or around the duplex connector, thereby potentially increasing the exterior dimensions of the connector and making it even more difficult, or impossible, to fit the duplex connector into the available space within the ducting.

It is an object of the invention to address these problems and to provide a more convenient apparatus and method for installing a multiple optical fiber connector when the optical fiber cable is to be routed in a duct for optical fiber cabling.

SUMMARY

According to a first aspect of the invention, there is provided a protective caddy for temporarily protecting a multiple optical fiber cable assembly for a multiple optical fiber connector, during insertion of said assembly into a length of ducting, said multiple optical fiber cable assembly comprising a multiple optical fiber cable and a plurality of optical fiber connector sub-assemblies, each of said sub-assemblies comprising an optical fiber ferrule having a termination end that terminates an optical fiber extending out from said optical fiber cable, the protective caddy being in the form of an elongate body, said body comprising:
 a first end and a second end, the first end, in use, being forwards of said second end relative to the direction of insertion of said assembly into said length of ducting;
 an axis, the axis extending between said ends; and
 a first receiving portion and a second receiving portion, said portions being adjacent one another along the axis whereby the first receiving portion is proximate the first end and the second receiving portion is proximate the second end; wherein the second receiving portion has an engagement feature for receiving and holding along said axis said multiple optical fiber cable and the first receiving portion has spaced radially around said axis a plurality of receptacles, each for receiving one of said optical fiber connector sub-assemblies, each receptacle having towards the first end a recess for protectively receiving said termination end of one of said optical fiber ferrules, whereby, in use, both the multiple optical fiber cable and the plurality of optical fiber connector sub-assemblies are held to the elongate body so that said termination ends are protected by said recesses during insertion of said protective caddy and multiple optical fiber cable assembly into said length of ducting.

A multiple optical fiber connector may be composed of two or more single optical fiber connectors that are either joined together or held together so that in use multiple optical fiber connections may be made with a mating connector, for example a multiple optical fiber socket or a multiple optical fiber plug.

Such multiple connectors are most commonly duplex connectors formed from two joined-together single optical fiber connector components.

There may be multiple such optical fiber cables, each one of which holds at least one of the optical fibers. However, in a preferred embodiment of the invention, there is one optical fiber cable which is common to all the optical fibers, each of which is therefore held within the common optical fiber cable.

In a preferred embodiment of the invention, the protective caddy is for temporarily protecting a duplex optical fiber cable assembly for an optical fiber duplex connector, during insertion of the assembly into a length of ducting. The duplex optical fiber cable assembly then comprises a duplex optical fiber cable and a pair of optical fiber connector sub-assemblies, each of said sub-assemblies comprising an optical fiber ferrule having a termination end that terminates an optical fiber extending out from the optical fiber cable. The engagement feature of the second receiving portion receives and holds along the axis the duplex optical fiber cable. The first receiving portion has on opposite sides of the axis a pair of receptacles, each for receiving one of the optical fiber connector sub-assemblies. Each receptacle then has towards the first end, one of the recesses for protectively receiving the termination end of one of the optical fiber ferrules. In use, both the duplex optical fiber cable and the pair of optical fiber connector sub-assemblies are held to the elongate body so that said termination ends are protected by the recesses during insertion of the protective caddy and duplex optical fiber cable assembly into the length of ducting.

In a preferred embodiment of the invention, the protective caddy is substantially cylindrical in form with receptacles for receiving and engaging with the optical fiber cable and the optical fiber connector sub-assemblies. As the sub-assemblies may also incorporate components which are also substantially cylindrical, the assembly of the sub-assemblies and protective caddy may together present a substantially cylindrical outer form, which will help smooth the insertion of the assembly into the ducting. Preferably, the protective caddy has a rounded, bullet-like tip.

According to a second aspect of the invention, there is provided an assembly of a protective caddy and a multiple optical fiber cable assembly for a multiple optical fiber connector for insertion into a length of ducting, said multiple optical fiber cable assembly comprising a multiple optical fiber cable and a plurality of optical fiber connector sub-assemblies, each of said sub-assemblies comprising an optical fiber ferrule having a termination end that terminates an optical fiber extending out from said optical fiber cable, wherein:
 the protective caddy is in the form of an elongate body, said body comprising:
 a first end and a second end, the first end, in use, being forwards of said second end relative to the direction of insertion of said assembly into said length of ducting;
 an axis, the axis extending between said ends; and
 a first receiving portion and a second receiving portion, said portions being adjacent one another along the axis whereby the first receiving portion is proximate the first end and the second receiving portion is proximate the second end, the second receiving portion having an engagement feature for receiving and holding along said axis said multiple optical fiber cable and the first receiving portion having spaced radially around said axis a plurality of receptacles, each for receiving one of said optical fiber connector sub-assemblies, each receptacle having towards the first end a recess for protectively receiving said termination end of one of said optical fiber ferrules, whereby said multiple optical fiber cable is received and held along said axis by the engagement feature of the second receiving portion, and each of said optical fiber connector sub-assemblies is received and held within one of said receptacles, with the termination end of each optical fiber ferrule being received within one of said recesses so that said termination ends are protected by said recesses during insertion of said protective caddy and multiple optical fiber cable assembly into a length of ducting.

According to a third aspect of the invention, there is provided a method of using a protective caddy in the installation of a multiple optical fiber cable assembly routed through a duct, the multiple optical fiber cable assembly comprising a multiple optical fiber cable and a plurality of optical fiber connector sub-assemblies, each of said sub-assemblies comprising an optical fiber ferrule having a termination end that terminates an optical fiber extending out from said optical fiber cable, and the protective caddy comprising an elongate body, said body comprising a first end, a second end and having therein a first receiving portion and a second receiving portion, the first end, in use, being forwards of said second end relative to the direction of insertion of said assembly into said length of ducting, and the first receiving portion being proximate said first end and the second receiving portion being proximate said second end, the first receiving portion having a plurality of receptacles, each receptacle having towards the first end a recess, wherein the method comprises the steps of:

engaging said multiple optical fiber cable with the second receiving portion so that said cable is received and held by the second receiving portion along an axis extending between the first end and the second end of said body;

engaging each of said optical fiber connector sub-assemblies cable with the first receiving portion when each of said sub-assemblies is received and held within a corresponding one of said receptacles, with the termination end of each optical fiber ferrule being received within one of said recesses so that said termination ends are protected by said recesses;

inserting of said protective caddy and multiple optical fiber cable assembly into a length of ducting so that said termination ends are protected by said recesses during insertion of said protective caddy and multiple optical fiber cable assembly into said length of ducting; and removing said protective caddy from the multiple optical fiber cable assembly after said multiple optical fiber cable assembly has passed through said length of ducting.

Each of said receptacles will have an opening. Because the axis is between the receptacles, these openings then face away from the axis, that is, the receptacles open laterally outwards with respect to the axis.

In a preferred embodiment of the invention, each receptacle is elongate in a direction parallel with the axis of the elongate body. Each receptacle then has a first end towards the first end of the elongate body and a second end towards the second receiving portion. The recess of each of the elongate receptacles is then at the first end of each of the receptacles.

The main body may have a wall which separates the first receiving portion from the second receiving portion. This wall may then be at the second end of each of the receptacles. The wall may also have a plurality of slots that extend or cut through the wall. Each of these slots preferably extends radially inwards from an outer periphery of the wall and provides an opening in the wall for receiving an optical fiber extending between the optical fiber cable and one of the optical fiber connector sub-assemblies.

The elongate body may have at the first end a rounded end to aid insertion of the protective caddy down the length of ducting.

The first end may be joined to the wall separating the receiving portions by a plurality of bands that are spaced radially around the axis such that each receptacle is bounded by a pair of adjacent bands. In the case of a duplex optical fiber cable, when there is a pair of bands each of these may extend on opposite sides of the axis in a direction substantially parallel with the axis.

Each of the bands may have an inwardly opposed surface that extends along one side of both receptacles. The bands are preferably separate from one another along their length so that the receptacles have an opening where these adjoin along the said axis. The bands may then resiliently flex apart when receiving the sub-assemblies.

The bands may be joined to one another by the wall which separates the first receiving portion from the second receiving portion. This wall may have a line of weakness or a region of weakness so that the wall can be manually broken at this weakness in order to pull the bands apart to facilitate the release of the optical fiber connector sub-assemblies from the first receiving portion after insertion of the assembly into the length of ducting.

Each of the inwardly opposed surfaces may have a concave feature for gripping the optical fiber connector sub-assembly received within one of the receptacles.

In a preferred embodiment of the invention, the engagement feature of the second receiving portion is a cylindrically shaped clip that has an opening along one side into which an optical fiber can be press-fitted to hold the cable along the axis of the elongate body.

BRIEF DESCRIPTION OF THE DRAWINGS

The invention will now be further described, by way of example only, and with reference to the accompanying drawings, in which.

DETAILED DESCRIPTION OF EMBODIMENTS

A variety of optical fiber connectors are available, but SC and LC optical fiber connectors are the most common types of connectors on the market. The example given below relates to a dual LC optical fiber connector that is composed of two single LC optical fiber connectors. Such connectors have cylindrical ferrules, but the person skilled in the art will recognise that the principles of the invention described below can be applied to other types of dual optical fiber connector including those that have a non-cylindrical or stepped ferrule.

Figure 1:
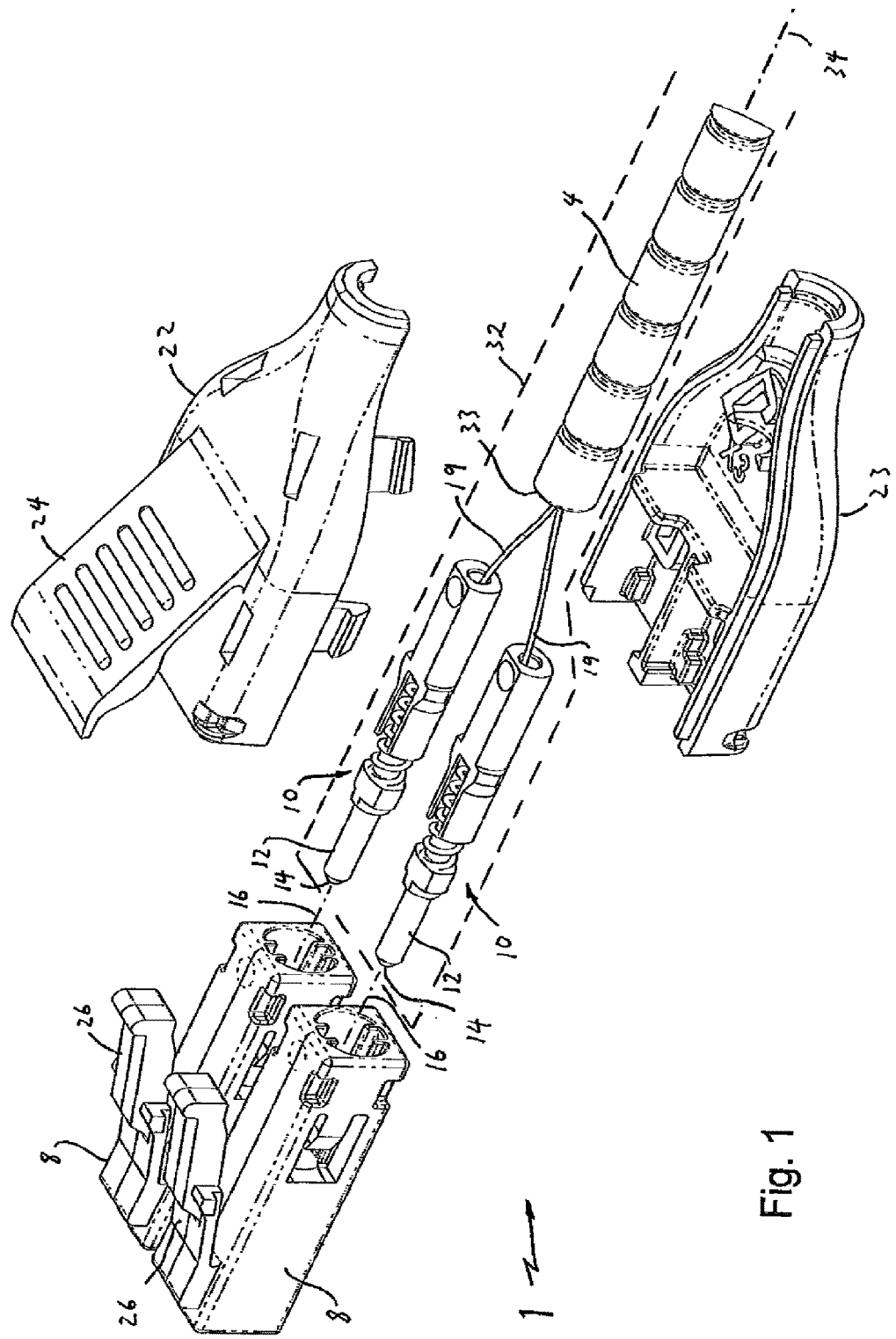
FIG. 1 is an exploded perspective view of an optical fiber duplex connector comprising a duplex optical fiber cable and a pair of optical fiber connector sub-assemblies around which is assembled an outer housing and a clamshell top and bottom cover with a quick release mechanism.
Figure 2:
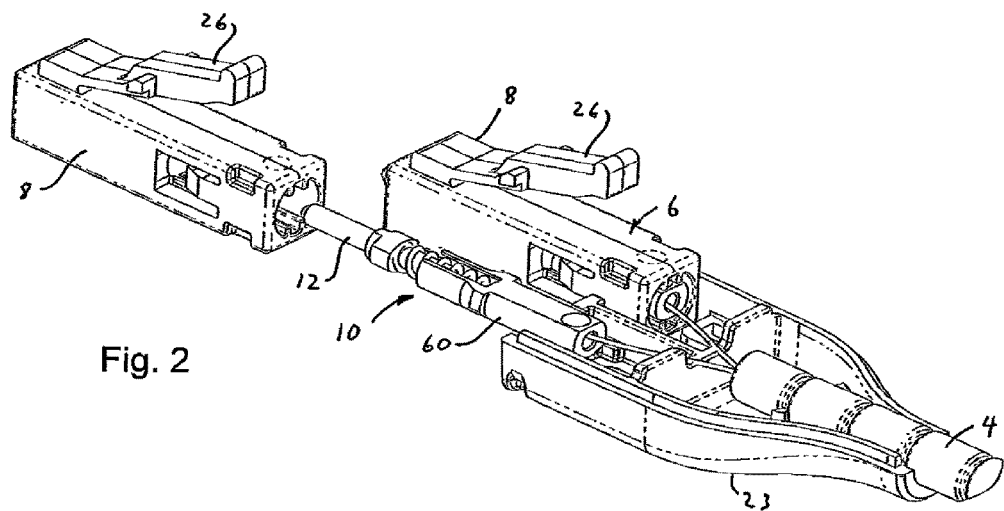
FIGS. 2 and 3 illustrate how the optical fiber duplex connector of FIG. 1 is assembled.
Figure 3:
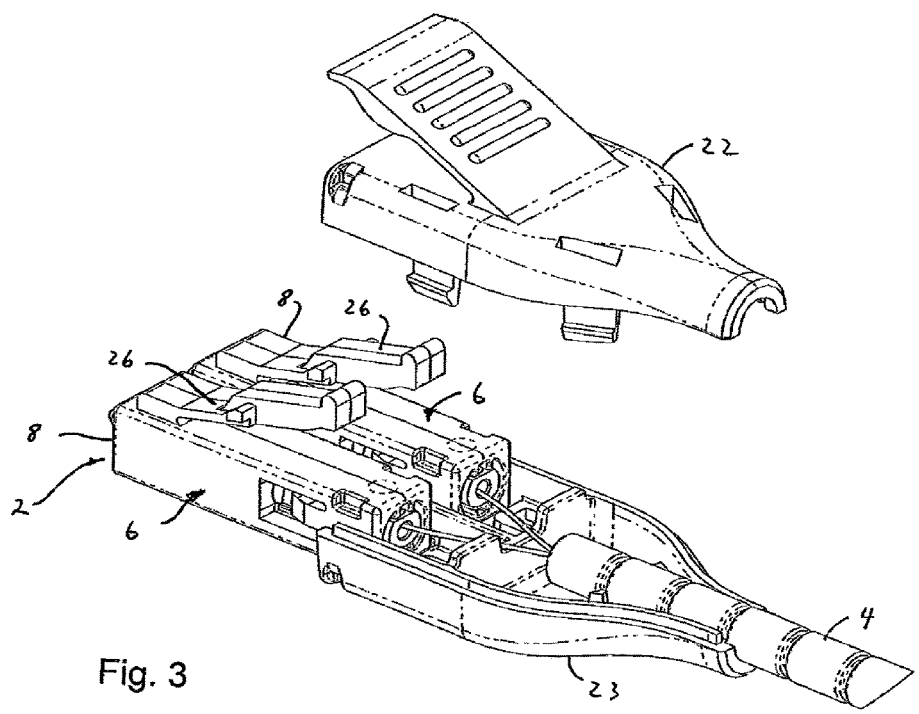
Figure 4:
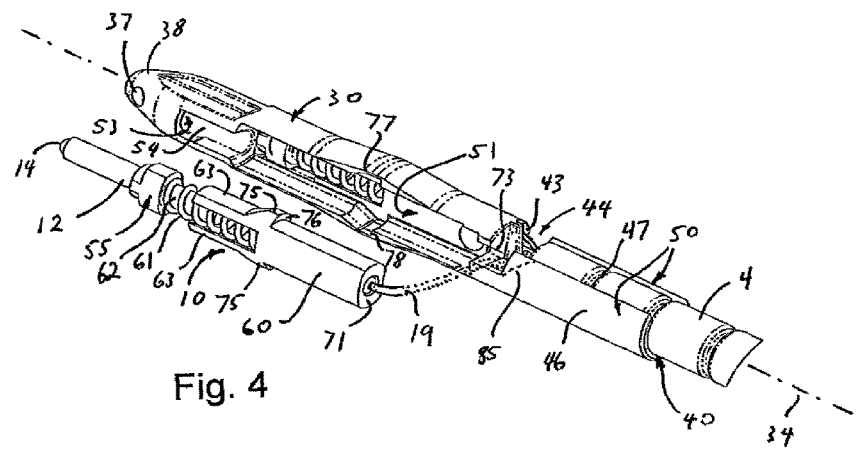
FIG. 4 is a perspective view of a protective caddy having a first receiving portion and a second receiving portion for receiving, respectively, the pair of optical fiber connector sub-assemblies and the duplex optical fiber cable

FIGS. 1 to 3 show some of the components of a prior art optical fiber duplex connector 1 and also indicate how these components are put together to form the connector 1. The connector 1 comprises a dual LC optical fiber connector 2 at the end of a duplex optical fiber cable 4. The dual connector 2 has a pair of identical LC optical fiber connectors 6 side-by-side. Each LC connector 6 has an outer housing 8 into which is seated an optical fiber connector sub-assembly 10. Each of the sub-assemblies 10 has an elongate cylindrical optical fiber ferrule 12 having at one end a termination end 14. In this example, the ferrule is of a ceramic material, although other materials may be used, as is known in the art.

Figure 7:
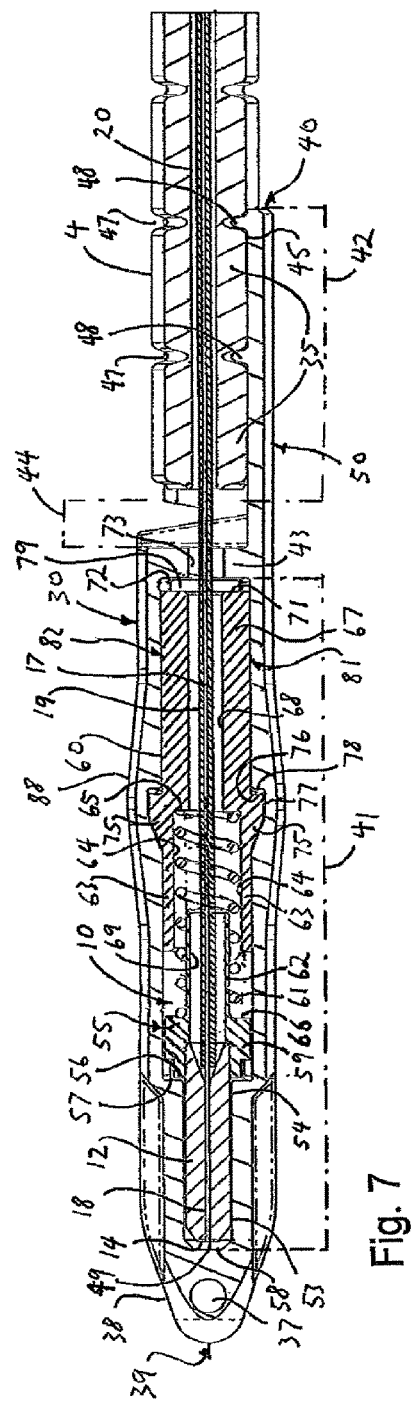
FIG. 7 is a cross section through the assembly, taken along the line VII-VII of FIG. 6.
Figure 8:
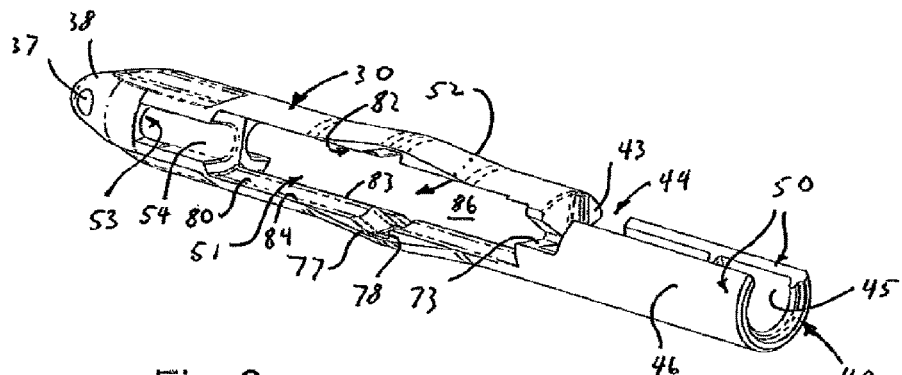
FIGS. 8 to 10 show various perspective views of the protective caddy prior to use with the optical fiber connector sub-assemblies and duplex optical fiber cable.
Figure 9:
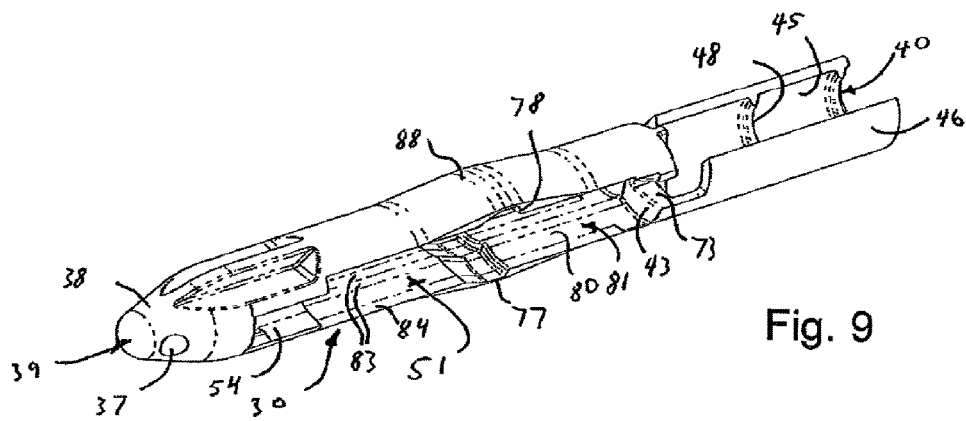

With reference now also to FIG. 7, the ferrule 12 has along its axis 16 a hollow core 18 which holds and aligns an optical fiber 17, which will most often be a single mode glass fiber. The person skilled in the art will recognise this as a conventional arrangement, in which the fiber is terminated at the ferrule termination end 14, which is polished to minimise insertion loss when the connector is joined to a matching optical fiber socket (not shown). The ferrules 12 therefore each terminate one optical fiber 17, 19 extending out from a bore 20 of the optical fiber cable 4.

The connector 2 is mechanically joined to the cable 4 by a clamshell cover having top and bottom portions 22, 23. The top portion 22 has a quick release mechanism in the form of a flexible plate 24 which when pressed by a user pushes down on a release lever 26 on each of the outer housings 8. The component of FIGS. 1 to 3 are all conventional and well-known in the art, and so will not be further described in detail.

A preferred embodiment of the invention is illustrated in FIGS. 4 to 10, which shows how a protective caddy 30 having the form of an elongate body is used to temporarily protect a duplex optical fiber cable assembly during insertion of the assembly into a length of ducting 31, which in this example is a microduct, but which may be any other type of ducting. In this example the caddy has a one-piece elongate body.

The components of a duplex optical fiber cable assembly are indicated in FIG. 1 as those inside a dashed line 32, and comprise the pair of optical fiber connector sub-assemblies 10, the portion of the optical fiber cable 4 to be inserted into the ducting 31 and the pair of optical fibers 19 each of which extends from an end 33 of the cable 4 into one of the sub-assemblies 10.

The duplex optical fiber cable assembly 32 is significantly smaller than the fully assembled connector 2 in terms of cross-sectional dimensions relative to an axis 34 that extends along the centre of the optical fiber cable 4 and along a line mid-way between the side-by-side sub-assemblies 10. Thus, the assembly 32 may be inserted into ducting with internal dimensions too small to accept the fully assembled connector 2. The components of the duplex optical fiber cable assembly 32, particularly the termination end 14 of the ferrule 12, are delicate and could not be inserted into ducting without some sort of protection. The optical fibers 19 will normally include protective polymer cladding but are also vulnerable to damage if bent more sharply than a minimum bend radius. The minimum acceptable bend radius depends on the type of optical fiber, but is of the order of 10 mm.

The optical fiber connector sub-assemblies 10 and an end-most portion 35 of the cable 4 are therefore temporarily joined to protective caddy 30 prior to insertion into the length of ducting 31. After the assembled caddy 30 and duplex optical fiber cable assembly 32 has been inserted through the ducting, for example by pulling a line or cord 36 affixed to an aperture 37 in a rounded end 38 of the caddy at a front end 39 of the caddy, and/or by jetting, and/or by pushing of the cable 4, the caddy 30 is removed from the duplex optical fiber cable assembly 32 prior to completing the assembly of the connector 1 as described above.

As indicated by dot-dashed lines in FIG. 7, the protective caddy according to the preferred embodiment of the invention has toward the first end 39 a first receiving portion 41 and towards an opposite second end 40 a second receiving portion 42. Between these ends, the first and second receiving portions have outermost surfaces that are substantially cylindrical or circular about an insertion direction, such that the caddy body 30 has an axis coincident with the cable axis 34.

The first and second receiving portions 41, 42 are adjacent one another along the axis 34, being separated by a wall 43 at a rear end of the first portion and by a clearance gap 44 at the forwards end of the second receiving portion 42. The first receiving portion is therefore proximate the first end 39 and the second receiving portion is proximate the second end 40 of the protective caddy 30.

The first and second receiving portions 41, 42 are both preferably elongate in form, having a length greater than the maximum diameter of parts of the caddy 30 having these portions. The first and second receiving portions also match the elongate shape of, respectively, the two sub-assemblies 10 and the forwards cable end portion 35 so that the two sub-assemblies can be securely held and carried by the first receiving portion 41 and so that the cable end portion 35 can be securely held and carried by the second receiving portion 42.

The second receiving portion 42 has a clip-like engagement feature for holding the duplex optical fiber cable 4, in the form of a semicircular clip or cradle 50 having substantially cylindrical inner and outer walls 45, 46. The inner wall 45 has a series of circumferentially extending ridges 48 which seat within correspondingly shaped grooves 47 in the outer wall of the cable 4. These grooves 47 are a bend-limiting feature of the cable such that the cable can be bent into an arc easily until one side of the grooves pinch together or close up, after which the force required to further bend the cable rises sharply. Such bend-limited tubing for an optical fiber cable is known in the art. In the present invention, this feature is used to secure the cable to the caddy in an axial direction, once the internal ridges 48 of the cradle are seated within the cable grooves 47.

The first receiving portion 41 has on laterally opposite sides of the 34 axis a pair of receptacles 51, 52, each for receiving one of the optical fiber connector sub-assemblies 10. The receptacles are therefore spaced radially around the axis, or in other words, spaced circumferentially around the caddy body. Each of the receptacles is a mirror image of the other, about a plane that encompasses the axis 34 of the caddy body 30.

Each receptacle 51, 52 has towards the first end 39 of the caddy body 30 a recess 53 for protectively receiving the termination end 14 of one of the optical fiber ferrules 12. In this example, each recess is within the rounded end 38 and has a cylindrical inner shape which closely matches the cylindrical outer shape of each ferrule. Each recess 53 extends in a direction parallel with, and on laterally opposite sides to, the axis 34, so that each ferrule 12 can easily slide into and out from each recess, with minimal clearance, in order to exclude as far as possible any environmental contamination from reaching the ferrule ends 14 once seated within the recesses 53. Behind each recess is a U-shaped channel 54 for accepting insertion of the ferrule 12 in a lateral direction with respect to the axis 34, and for guiding the ferrule end 14 into its recess. Each U-shaped channel is dimensioned to position and hold the ferrule once inserted. This arrangement helps to avoid any contact between the ferrule end 14 and material of the caddy body 30 during insertion and removal of the ferrule from the receptacle 51, 52.

As shown most clearly in FIG. 7, the ferrule is held by a conventional ferrule holder 55 which has on a shoulder 59 a forwards surface 56 that extends radially away from the ferrule core 18. The shoulder 56 is engaged with a ledge 57 inside each receptacle 51, 52 when the sub-assembly is seated within each receptacle. The distance in an axial direction between the ledge 57 and a base 58 of the recess 53 is greater than the corresponding distance between the ferrule holder shoulder and the ferrule termination end 14, such that a gap 49 is always provided between the termination end and recess base 58. This also helps to protect the termination end from any contact damage.

As shown most clearly in FIG. 7, the rear components of each optical fiber connector sub-assembly 10 are a ferrule holder base 60 and a coil spring 61, which together with the ferrule holder 55 form a spring-loaded ferrule carrier assembly. The ferrule holder 55 has a hollow cylindrical tubular stem 62 that extends from the shoulder 59 in a direction away from the ferrule 12, and which is concentrically seated at forwards end of the ferrule holder base 60 within a pair of forwardly projecting arms 63 which have inwardly opposed part cylindrical surfaces 64. The coil spring is seated between the stem 62 and part cylindrical surfaces 64 and is retailed in an axial direction between an annular ledge 65 in the ferrule holder base 60 at the base of the arms 63 and a rear surface 66 of the shoulder 59 of the ferrule holder 55. The ferrule holder base 60 has a tubular rear portion 67 which supports the arms 63 and which has a central bore 68 that ends from a rear end 71 of the ferrule holder base to the arms 63. The bore 68 is aligned with the space enclosed by the coil spring 61 and with a bore 69 through the ferrule holder stem 62. One of the buffered optical fibers 19 extends through these bores 68, 69, with the core 17 of the optical fiber seated within the hollow core 18 of the ferrule 12.

Each optical fiber connector sub-assembly 10 is inserted into the corresponding receptacle 51, 52 as follows. First the ferrule 12 is inserted forwards and at an angle to the axis 34 into the U-shaped channel 54 and then is slid forwards until the termination end 14 begins to enter the recess 53. At the same time, the rear part of the assembly, that is, the ferrule holder 55, ferrule holder base 60 and coil spring 61, is rotated inwards in a direction towards the axis 34 until the rear part of the assembly enters one of the receptacles 51, 52. During this process, it is necessary to partially compress the spring 61, in order to bring the ferrule holder base 60 nearer the ferrule holder 55, so that the rearmost part of the sub-assembly 10 can fit within the length of the receptacle.

The ferrule holder base 60 has a pair of tapered flanges 75 on opposite external side of the arms 63. These flanges are used in a one-way snap-fit engagement of the ferrule holder base 60 inside the outer housing 8 of the connector 6. Each of these flanges has a rearwards facing ledge 76. The body of the caddy 30 has an external bulge 88 in the region of these flanges 75 to accommodate a pair of engagement features 77 inside each receptacle 51, 52. The engagement features each have a similar shape corresponding with that of the tapered flanges, but are longer in the axial direction to allow for some axial movement of the ferrule holder base 60 with respect to the caddy 30 once the sub-assembly 10 is engaged in the corresponding receptacle 51, 52.

In order for the sub-assembly 10 to be fully inserted into the receptacle 51, 52, the spring 61 must be compressed by the right amount for each of the tapered flanges 75 to enter the corresponding engagement feature 77. The spring 61 tends to expand once this engagement is made, pushing the rear end 71 of the ferrule holder base towards a rear end surface 72 of the receptacle, while at the same time ensuring a positive contact force between the shoulder 56 of the ferrule holder 55 and the ledge 57 inside each receptacle. The rear end surface 72 of the receptacle is the forward surface of the wall 43, and before the rear end 71 of the ferrule holder base contacts this surface 72, rearwards movement of the ferrule holder base 60 is stopped by contact of the rearwards facing ledge 76 of each tapered flange 75 with a corresponding forwards ledge 78 of each engagement feature 77. This arrangement ensures a small gap 79 remains between the rear end 71 of the ferrule holder base 60 and the wall forwards surface 72, which helps to protect the optical fiber 19 from sharp changes in direction at this point and which is also useful in providing a feature of the sub-assembly to be gripped by a tool when the sub-assembly is to be removed from the receptacle.

This arrangement, in which the engagement features 77 must be aligned with the tapered flanges 75, also helps to prevent over-compression of the spring during insertion or removal of the sub-assemblies 10 from the receptacles 51, 52.

The invention therefore preferably includes an engagement feature within each receptacle to position each sub-assembly in a longitudinal orientation in which a spring-loaded ferrule carrier assembly is seated with a rearmost surface of the assembly free from contact with a supporting surface and with the termination ferrule positively engaged within its recess.

The wall 43 has a pair of slots 73, one for each receptacle 51, 52. In this example, the slots open laterally outwards in opposite directions and are V-shaped, in order to guide the buffered optical fiber 19 into the optimal alignment with the bore 68 in the ferrule holder base 60 and the bore 20 in the optical fiber cable 4.

Figure 5:
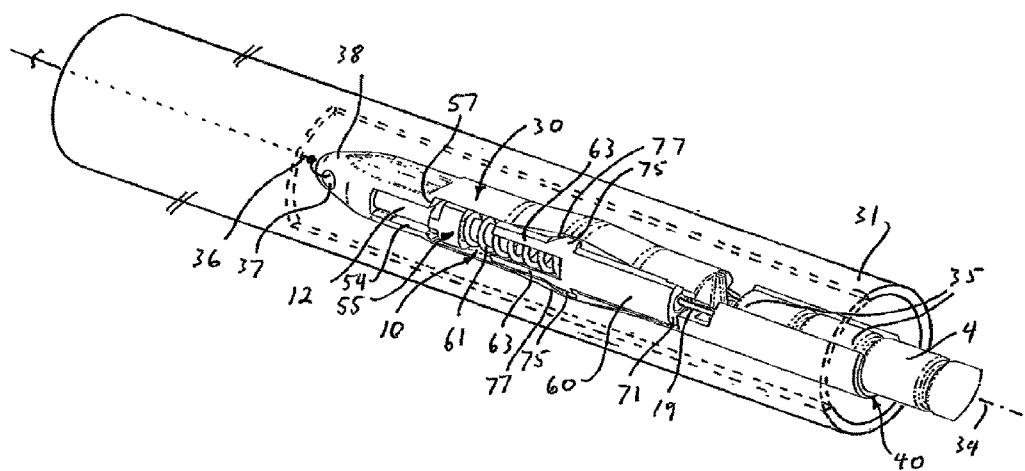
FIG. 5 shows how the protective caddy of FIG. 4 is used to protect the optical fiber connector sub-assemblies when the duplex optical fiber cable assembly is being inserted into a length of ducting.
Figure 6:
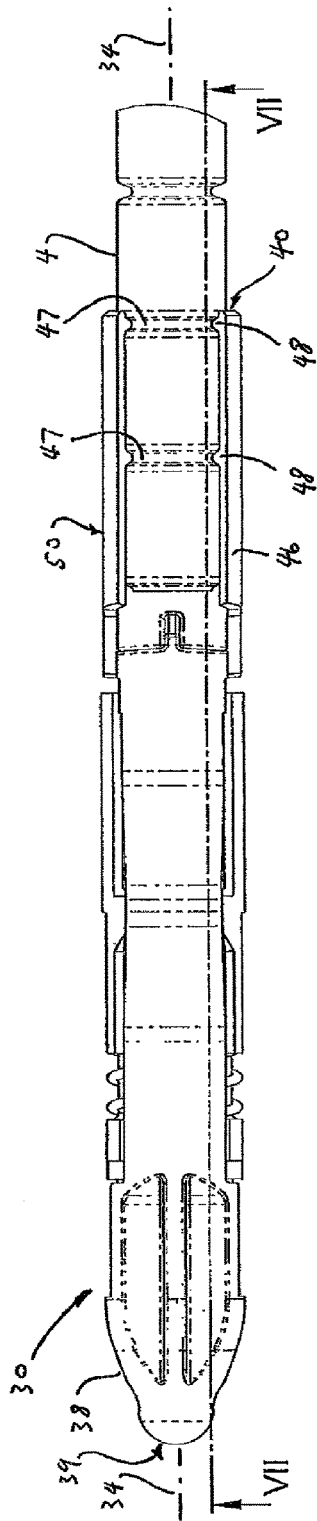
FIG. 6 shows a top view of the assembled protective caddy and optical fiber connector sub-assemblies and duplex optical fiber cable.

As can be seen most clearly from FIG. 5, the purpose of the clearance gap 44 is to provide space for the buffered optical fibers 19 to be routed between the sub-assemblies 10 and the cable 4 in an orientation and spacing similar to, but not identical with, the orientation of these components in the fully assembled connector 1. In particular, it is important that the orientation of the buffered optical fibers remains as straight as possible both during the joining of the duplex optical fiber cable assembly 32 to the caddy 30 and during the final separation of the caddy from the assembly 32 after the inserting through the ducting 31. For this reason, in order to minimise bending of the optical fiber 19, the part of the clip or cradle 50 nearest the slot 73 may, as shown by the dashed line 85 in FIG. 4, be cut away or chamfered to provide additional space for the movement of the buffered optical fiber 19.

Each receptacle 51, 52 is therefore a laterally accessible pocket in the first portion 41 of the caddy 30. Each receptacle has opposite side bands or walls 81, 82 extending from the rear surface 72 of the receptacle to the ledge 57 against which the ferrule holder 55 is seated. As shown most clearly in FIGS. 8 to 9, these side walls have a cylindrical central portion 80 running the length of the walls, either side of which is an inner lip 83 and an outer lip 84. These features of the cylindrical central portion 80 and inner and outer lips 83, 84 are continuous in a longitudinal direction, except where these are broken by the longitudinal engagement feature 77 where this extends laterally inside each recess 51, 52. Although only one wall 81 is shown fully in the drawings, the other wall 82 is a mirror image.

The inner lip 83 of each receptacle abuts the inner lip of the other receptacle along its most of its length so that there is an opening 86 between the receptacles 51, 52. The opening allows the sub-assemblies 10 to be inserted so that they are in contact, or nearly in contact, i.e. back-to-back, which minimises any wasted space in a lateral direction between the seated sub-assemblies 10. This therefore minimises the lateral extent of the caddy body 30 in this direction.

The arrangement of protective caddy described in detail above is therefore in the form of compartmentalised protective carrier or holder 30, and could be described as being a laterally segmented protective holder 30, for protecting a pair of optical fiber connector sub-assemblies of a duplex optical fiber cable.

The ferrule holder has an external dimension which just passes between the outer lips 84 with minimal clearance. The ferrule holder base 60, including tapered flanges 75, may be slightly larger than the distance between the opposed outer lips 84.

The material of the main body of the caddy 30 is preferably a plastics material, for example polypropylene, with the elongate body 30 being formed in an injection moulding process. In the preferred embodiment of the invention, the elongate body is resiliently flexible so that the ferrule holder base 60, including tapered flanges 75, can push apart the bands or walls 81, 82 in a central portion of the receptacle 51, 52 sufficiently so that the sub-assembly is received securely within the receptacle when the walls 81 relax after passage of the sub-assembly into the receptacle. The sub-assembly is then seated in the opposed longitudinal grooves.

The invention therefore preferably provides an arrangement in which the sub-assembly is temporarily secured within its receptacle in a press-fit engagement in which the receptacle resiliently deforms to accept the sub-assembly.

It should be noted that the ability of the receptacle walls to flex to allow passage of the sub-assembly into and out from each receptacle results not just from the choice of materials, but also from the presence of the opening 86 between the receptacles 51, 52 which permits the bands 81, 82 to flex. The opening therefore not only saves space, but provides a useful function in the temporary securing of the sub-assemblies 10 within the receptacle 51, 52.

The arrangement described above protects both the duplex optical fiber cable 4 and the pair of optical fiber connector sub-assemblies 10, and particularly the termination ends 14, during insertion of the protective caddy 30 and duplex optical fiber cable assembly 32 into the length of ducting 31.

As mentioned above, after the caddy 30 and duplex optical fiber cable assembly 32 have been fully inserted through the ducting 31, the protective caddy is removed from the duplex optical fiber cable assembly, after which the assembly of the optical fiber duplex connector incorporating the duplex optical fiber cable assembly is completed.

Figure 10:
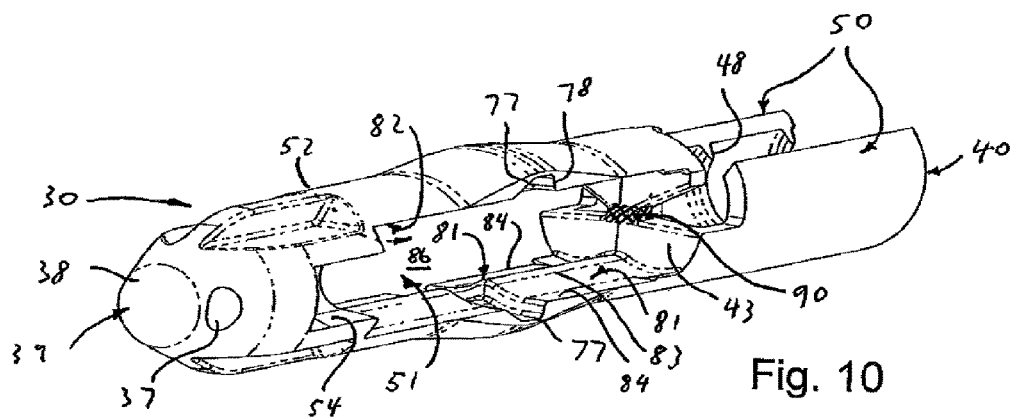

To facilitate removal of the protective caddy from the duplex optical fiber cable assembly, the caddy may, optionally, include a relatively weakened line or region adapted to be broken. FIG. 10 shows how the caddy 30 may be modified to create such a weakened line or region, by removing most of the material between the slots as indicated by cross-hatching indicated with numeral 90. A tool may then be used to prise apart of the top and bottom walls 81, 82 where these are joined by the wall 43 at the rear of the receptacles 51, 52. The top wall, which is not joined directly to the second receiving portion 42, may then be bent upwards and optionally broken off at a forwards end where this is joined to the rounded end 38, thereby allowing easy removal of the sub-assemblies 10, optical fibers 17, 19 and optical fiber cable 4 from the protective caddy 30. The invention therefore also extends to a protective caddy having a breakable elongate body 81, 90 to facilitate freeing the optical fiber connector sub-assemblies 10 from engagement with the first receiving portion 41.

The preferred embodiments described in detail above have a left/right symmetry for the receptacles, such that the cross-section through the receptacles is the same if rotated by 180.degree. about the axis of the elongate protective caddy.

From this it can be seen that although the arrangement described above relates to a duplex optical fiber cable assembly, the principles of the invention can be applied to an optical fiber cable assembly having more than two optical fibers, each with its own optical fiber connector sub-assembly. For example, an optical fiber cable assembly having three optical fibers and three corresponding optical fiber connector sub-assemblies can be secured using a protective caddy having three receptacles, each for receiving one of the optical fiber connector sub-assemblies. These receptacles can be spaced radially around the caddy axis so that in cross-section there is a triangular symmetry to the receptacles, such that the cross-section is the same if rotated by 120.degree. about the axis.

In the case of a protective caddy for temporarily protecting a multiple optical fiber cable assembly having four optical fibers, there would be a square symmetry to the receptacles, such that the cross-section is the same if rotated by 90.degree. about the axis.

Although there will be a limit to number of optical fibers which can usefully be combined into a single cable or connected to a multiple optical fiber connector, the person of ordinary skill in the art will see that the protective caddy can be adapted for use with any practical number of optical fiber connector sub-assemblies.

The invention described above therefore provides a convenient apparatus and method for installing a multiple optical fiber connector when the optical fiber cable is to be routed in a duct for optical fiber cabling.

It is to be recognized that various alterations, modifications, and/or additions may be introduced into the constructions and arrangements of parts described above without departing from the spirit or scope of the present invention, as defined by the appended claims.

What is claimed is:

1. A protective caddy for protecting a plurality of termination ends of a multiple fiber cable during insertion of the multiple fiber cable through a duct comprising:
   an elongate body configured to fit in a duct, surround a plurality of termination ends of a multiple fiber cable, be inserted through the duct, and maintain a plurality of protective recesses about the plurality of termination ends of the multiple fiber cable so as to protect the plurality of termination ends during insertion of the multiple fiber cable through the duct, the duct having an internal diameter less than a maximum width of a multiple fiber connector to be installed on the multiple fiber cable after the multiple fiber cable has been inserted through the duct; and
   wherein the elongate body is elongated in an axial direction and includes a plurality of caddy receptacles, each of the plurality of caddy receptacles being arranged adjacent to one another and configured to grip one of a plurality of fiber subassemblies during assembly, each of the plurality of fiber subassemblies being associated with one of the plurality of termination ends of the multiple fiber cable and each of the caddy receptacles forming a laterally accessed pocket, accessed in a direction transverse to the axial direction, shaped to fit each of the plurality of fiber subassemblies.

2. The protective caddy of claim 1, wherein the elongate body includes a cradle having a plurality of ridges, and the multiple fiber cable includes a plurality of bending limiting grooves, each of the plurality of cradle ridges configured to be seated in one of the plurality of grooves so as to axially secure the elongate gate body to the multiple fiber cable.

3. The protective caddy of claim 1, wherein the plurality of termination ends of the multiple fiber cable include a first termination end and a second termination end.

4. The protective caddy of claim 1, wherein each of the plurality of fiber subassemblies include a fiber ferrule.

5. The protective caddy of claim 1, wherein the plurality of caddy receptacles are each radially adjacent to one another.

6. The protective caddy of claim 1, wherein the plurality of fiber subassemblies are each configured to biasingly minimize bending of at least one fiber in the multiple fiber cable when the elongate body is installed on the plurality of fiber subassemblies, and when the elongate body is separated from the plurality of fiber subassemblies after the multiple fiber cable is inserted through the duct.

7. The protective caddy of claim 1, wherein the elongate body includes at least one wall portion extending between the plurality of caddy receptacles and the plurality of fiber subassemblies are each configured to forwardly bias a corresponding termination end in order to longitudinally position each subassembly with a rearmost surface of each subassembly being free from contact with a forwards surface of the wall portion when the elongate body is installed on the plurality of fiber subassemblies.

8. The protective caddy of claim 7, wherein the plurality of fiber subassemblies each have a flange and the each subassembly is configured to rearwardly bias the flange into engagement with an engagement feature within each of the plurality of caddy receptacles when the elongate body is installed on the plurality of fiber subassemblies.

9. The protective caddy of claim 1, wherein the plurality of fiber subassemblies are each configured to forwardly bias an optical fibre ferrule of a corresponding fiber in the multiple fiber cable in order to maintain a positive engagement of each of the plurality of termination ends in the plurality of protective recesses when the elongate body is installed on the plurality of fiber subassemblies.

10. The protective caddy of claim 1, wherein the plurality of fiber subassemblies includes a first fiber subassembly and a second fiber subassembly.

11. The protective caddy of claim 10, wherein the plurality of caddy receptacles includes a first caddy receptacle and second caddy receptacle, the first caddy receptacle having a first concave gripping portion shaped to grip the first fiber subassembly, and the second caddy receptacle having a second concave gripping portion shaped to grip the second fiber subassembly.

12. The protective caddy of claim 1, wherein the elongate body includes a rounded forward end portion having an inner surface arranged to form a forward portion of each of the plurality of protective recesses.

13. The protective caddy of claim 1, wherein the plurality of caddy receptacles include a first caddy receptacle and a second caddy receptacle, and the plurality of fiber subassemblies include a first fiber ferrule and a second fiber ferrule, the first caddy receptacle having a first U-shaped portion configured to fit the first fiber ferrule, and the second caddy receptacle having a second U-shaped portion configured to fit the second fiber ferrule.

14. The protective caddy of claim 1, wherein the elongate body includes a cradle having a clip engagement feature, and the multiple fiber cable includes a bending limiting groove, and the clip engagement feature is configured to fit the bend limiting groove so as to axially secure the elongate body to the multiple fiber cable.

15. The protective caddy of claim 1, wherein the elongate body includes a clip engagement feature, and the multiple fiber cable includes a bending limiting groove, and the clip engagement feature is configured to fit the bend limiting groove so as to axially secure the elongate body to the multiple fiber cable.

16. A protective caddy for protecting a plurality of termination ends of a multiple fiber cable during insertion of the multiple fiber cable through a duct comprising:
an elongate body configured to fit in a duct having an internal diameter less than a maximum width of a multiple fiber connector to be installed on the multiple fiber cable, the elongate body further configured to surround a first termination end of the multiple fiber cable and a second termination end of the multiple fiber cable, be inserted through the duct, and maintain first and second protective recesses about the first and second termination ends of the multiple fiber cable so as to protect the first and second termination ends when the multiple fiber cable is inserted through the duct; and
wherein the elongate body is elongated in an axial direction and forms a first receptacle and a second receptacle, the first receptacle configured to grip a first fiber subassembly associated with the first termination end when the multiple fiber cable is inserted through the duct, and the second receptacle configured to grip a second fiber subassembly associated with the second termination end when the multiple fiber cable is inserted through the duct and each of the receptacles forming a laterally accessed pocket, accessed in a direction transverse to the axial direction, shaped to fit each of the plurality of fiber subassemblies.

17. The protective caddy of claim 16, wherein the first and second receptacles are each laterally adjacent to one another.

18. The protective caddy of claim 16, wherein each of the first and second receptacles form a laterally accessed pocket shaped to fit at least one of the first and second fiber subassemblies.

19. The protective caddy of claim 16, wherein the first and second fiber subassemblies are each configured to biasingly minimize bending of at least one fiber in the multiple fiber cable when the elongate body is installed on the first and second fiber subassemblies, and when the elongate body is separated from the first and second fiber subassemblies after the multiple fiber cable is inserted through the duct.

20. The protective caddy of claim 16, wherein the first and second fiber subassemblies are each configured to forwardly bias an optical fibre ferrule of a corresponding fiber in the multiple fiber cable in order to maintain a positive engagement of the first and second termination ends in the protective recesses when the elongate body is installed on the first and second fiber subassemblies.

21. The protective caddy of claim 16, wherein the elongate body includes a slot radially extending inwards so as to form an opening shaped to allow an least one optical fiber to extend through the opening from the multiple fiber cable and to at least one of the first and second fiber subassemblies.

22. The protective caddy of claim 16, wherein the first receptacle has a concave gripping portion shaped to grip the first fiber subassembly.

23. The protective caddy of claim 16, wherein the first fiber subassembly includes a fiber ferrule, and the first receptacle has a U-shaped portion configured to laterally fit the fiber ferrule.

24. The protective caddy of claim 16, wherein the first fiber subassembly includes a first fiber ferrule, the first receptacle has a first U-shaped portion configured to laterally receive the first fiber ferrule from a first direction, and the second fiber subassembly includes a second fiber ferrule, and the second receptacle has a second U-shaped portion configured to laterally receive the second fiber ferrule from a second direction substantially opposite to the first direction.

25. The protective caddy of claim 16, wherein the elongate body includes a cradle having a clip engagement feature configured to fit a bend limiting groove of the multiple fiber cable so as to axially secure the elongate body to the multiple fiber cable.

26. The protective caddy of claim 16, wherein the elongate body includes a cable engagement feature configured to axially secure the elongate body to the multiple fiber cable.

27. A protective caddy for protecting a plurality of termination ends of a multiple fiber cable during insertion of the multiple fiber cable through a duct comprising:
   an elongate body configured to fit in a duct having an internal diameter less than a maximum width of a multiple fiber connector to be installed on the multiple fiber cable, the elongate body further configured to surround a first termination end of the multiple fiber cable and a second termination end of the multiple fiber cable, be inserted through the duct, and maintain first and second protective recesses about the first and second termination ends of the multiple fiber cable so as to protect the first and second termination ends when the multiple fiber cable is inserted through the duct;
   wherein the elongate body is elongated in an axial direction and forms a first receptacle and a second receptacle, the first receptacle configured to grip a first fiber subassembly associated with the first termination end when the multiple fiber cable is inserted through the duct, and the second receptacle configured to grip a second fiber subassembly associated with the second termination end when the multiple fiber cable is inserted through the duct, and
   wherein the elongate body includes a wall portion extending between the first and second receptacles at a rearward portion of the elongate body in the axial direction, and the first and second fiber subassemblies are each configured to forwardly bias a corresponding termination end in order to longitudinally position each subassembly with a rearmost surface of each subassembly being free from contact with a forward-facing surface of the wall portion when the elongate body is installed on the first and second fiber subassemblies.

28. The protective caddy of claim 27, wherein the first and second fiber subassemblies each have a flange and the first and second fiber subassemblies are each configured to rearwardly bias the flange into engagement with an engagement feature within each of the first and second receptacles when the elongate body is installed on the first and second fiber subassemblies.

\* \* \* \* \*